(12) United States Patent
Tamura et al.

(10) Patent No.: US 11,773,973 B2
(45) Date of Patent: Oct. 3, 2023

(54) PARKING MECHANISM AND DRIVE APPARATUS

(71) Applicant: NIDEC CORPORATION, Kyoto (JP)

(72) Inventors: Tsubasa Tamura, Kyoto (JP); Keisuke Aso, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/684,351

(22) Filed: Mar. 1, 2022

(65) Prior Publication Data

US 2022/0282789 A1 Sep. 8, 2022

(30) Foreign Application Priority Data

Mar. 4, 2021 (JP) ................................. 2021-034108

(51) Int. Cl.
*F16H 63/34* (2006.01)
*B60K 1/00* (2006.01)

(52) U.S. Cl.
CPC ..... *F16H 63/3433* (2013.01); *F16H 63/3466* (2013.01); *B60K 2001/001* (2013.01)

(58) Field of Classification Search
CPC .. F16H 63/34; F16H 63/3466; F16H 63/3433; B60T 1/005; B60T 1/062
See application file for complete search history.

(56) References Cited

U.S. PATENT DOCUMENTS

2020/0072351 A1* 3/2020 Chen ..................... F16D 63/006
2022/0042599 A1* 2/2022 Diebel ................ F16H 63/3425

FOREIGN PATENT DOCUMENTS

CN 103256384 A 8/2013
CN 205001503 U 1/2016

* cited by examiner

*Primary Examiner* — Lori Wu
(74) *Attorney, Agent, or Firm* — HAUPTMAN HAM, LLP

(57) ABSTRACT

A parking mechanism includes a shaft, a movable portion rotatable with the shaft, a pawl having a claw and movable as the movable portion rotates, a parking gear meshable with the claw, and a stopper contactable with the movable portion. The pawl is switched between parking and non-parking positions in which the claw meshes with and separates from the parking gear, respectively. The movable portion has a first elastic member attached to the shaft, and a contact member connected to the shaft via the first elastic member and in contact with the pawl. The contact member is rotatable in a rotational direction relative to the shaft as the first elastic member is elastically deformed, and is contactable with the stopper in the rotational direction. The stopper faces the contact member at a distance in the rotational direction when the pawl is switched between the parking and non-parking positions.

14 Claims, 8 Drawing Sheets

PARKING MECHANISM AND DRIVE APPARATUS

CROSS-REFERENCE TO RELATED APPLICATIONS

The present invention claims priority under 35 U.S.C. § 119 to Japanese Patent Application No. 2021-034108 filed on Mar. 4, 2021, the entire content of which is incorporated herein by reference.

FIELD OF THE INVENTION

The present invention relates to a parking mechanism and a drive apparatus.

BACKGROUND ART

For example, a parking lock mechanism mounted on a vehicle is known.

In a parking lock mechanism, there is a case where a pawl member is moved by rotation of a movable portion, and a claw portion of the pawl member is engaged with a parking gear, so that a vehicle is put into a parking state. In this case, for example, in a case where the claw portion have come into contact with a tooth of the parking gear and the pawl member have been flipped up, the movable portion may have rotated too much and come off the pawl member. For this reason, there has been a possibility that operation of the parking lock mechanism malfunctions.

SUMMARY

One aspect of a parking mechanism of the present invention includes a driven shaft that can rotate about a central axis that extends in a predetermined direction, a movable portion that rotates as the driven shaft rotates, a pawl member that has a claw portion and moves as the movable portion rotates, a parking gear with which the claw portion can mesh, and a stopper portion that can come into contact with the movable portion in a rotational direction of the movable portion. A position of the pawl member is switched between a parking position in which the claw portion meshes with the parking gear and a non-parking position in which the claw portion separates from the parking gear as the movable portion rotates. The movable portion has a first elastic member attached to the driven shaft, and a contact member that is connected to the driven shaft via the first elastic member and comes into contact with the pawl member. The contact member can rotate in the rotational direction relative to the driven shaft as the first elastic member is elastically deformed, and can come into contact with the stopper portion in the rotational direction. The stopper portion faces the contact member at a distance in the rotational direction when the position of the pawl member is switched between the parking position and the non-parking position.

One aspect of a drive apparatus of the present invention is a drive apparatus mounted on a vehicle. The drive apparatus includes a power unit that drives the drive apparatus, a transmission mechanism unit connected to the power unit, the parking mechanism attached to the transmission mechanism unit, and a housing that internally houses the power unit, the transmission mechanism unit, and the parking mechanism.

The above and other elements, features, steps, characteristics and advantages of the present disclosure will become more apparent from the following detailed description of the preferred embodiments with reference to the attached drawings.

DETAILED DESCRIPTION

Figure 1:
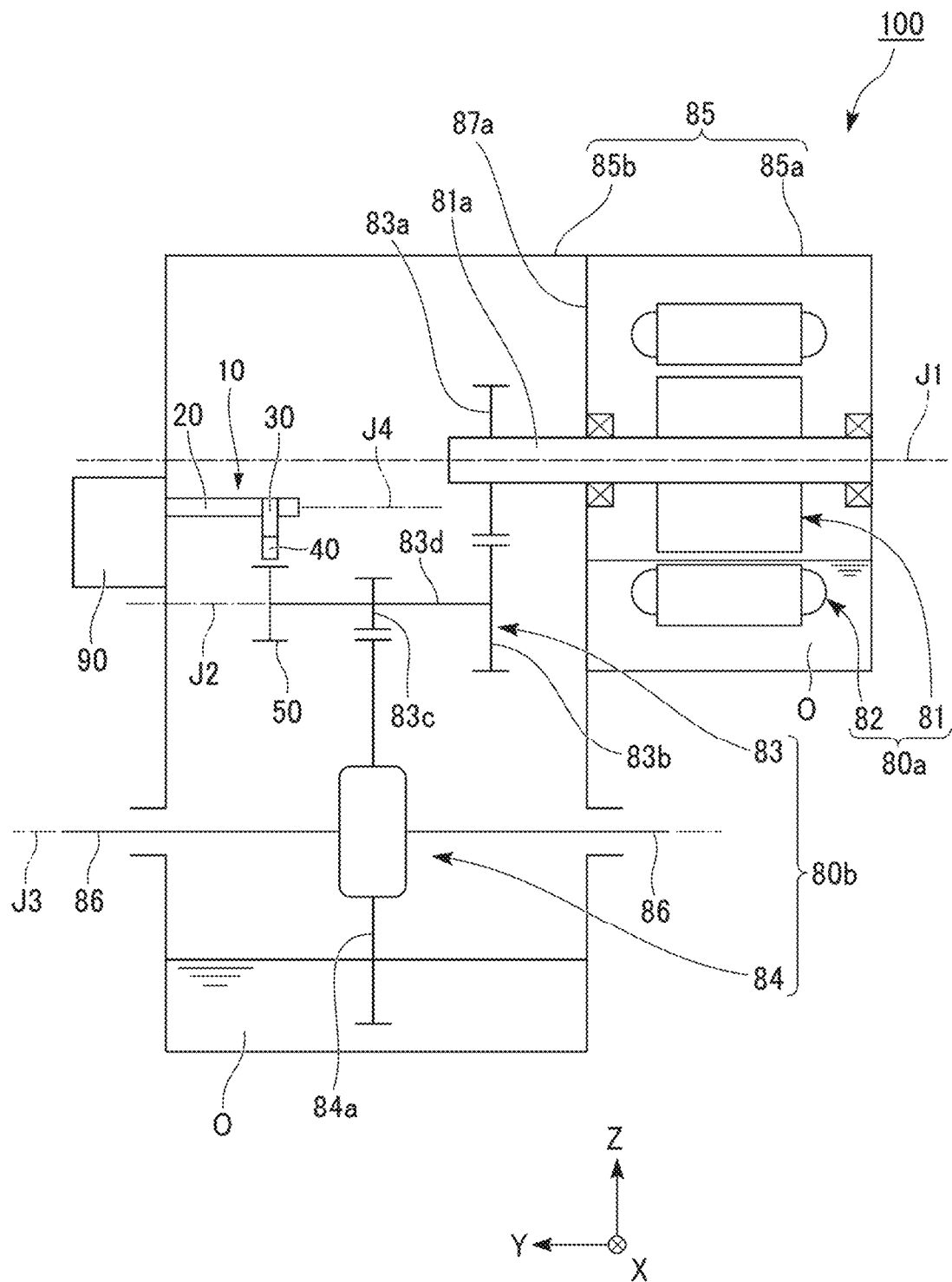
FIG. 1 is a cross-sectional view schematically illustrating a drive apparatus according to the present embodiment.

Each diagram illustrates an X-axis, a Y-axis orthogonal to the X-axis, and a Z-axis orthogonal to the X-axis and the Y-axis. In description below, a direction parallel to the Z-axis is referred to as the "vertical direction", a direction parallel to the Y-axis is referred to as the "left-right direction", and a direction parallel to the X-axis is referred to as the "front-rear direction". The vertical direction, the left-right direction, and the front-rear direction are directions orthogonal to each other. The vertical direction is, for example, the vertical direction in a vehicle on which a drive apparatus 100 illustrated in FIG. 1 is mounted. The left-right direction is, for example, the left-right direction in the vehicle on which the drive apparatus 100 is mounted. The front-rear direction is, for example, the front-rear direction in the vehicle on which the drive apparatus 100 is mounted.

Of the vertical directions, the positive side to which an arrow of the Z-axis points is referred to as the upper side, and the negative side opposite to the side to which the arrow of the Z-axis points is referred to as the lower side. Of the left-right directions, the positive side to which an arrow of the Y-axis points is referred to as the left side, and the negative side opposite to the side to which the arrow of the Y-axis points is referred to as the right side. Of the front-rear directions, the positive side to which an arrow of the X-axis points is referred to as the front side, and the negative side opposite to the side to which the arrow of the X-axis points is referred to as the rear side.

In an embodiment below, the left-right direction corresponds to a "predetermined direction". Note that the terms, "vertical direction", "left-right direction", "front-rear direction", "upper side", "lower side", "left side", "right side", "front side", and "rear side" are merely used for describing arrangement and other relationships between each part. The actual arrangement and other relationships may include those other than the relationships indicated by these terms.

The drive apparatus 100 of the present embodiment illustrated in FIG. 1 is a drive apparatus that is mounted on the vehicle and rotates an axle 86. As illustrated in FIG. 1, the drive apparatus 100 includes a power unit 80a, a transmission mechanism unit 80b, a parking mechanism 10, a housing 85, and an electric actuator 90.

The housing 85 internally houses the power unit 80a, the transmission mechanism unit 80b, and the parking mechanism 10. The housing 85 has a first housing 85a that houses the power unit 80a, and a second housing 85b that houses the transmission mechanism unit 80b and the parking mechanism 10. The second housing 85b is connected to, for example, the left side of the first housing 85a. For example, oil O is stored inside the first housing 85a and inside the second housing 85b.

Figure 2:
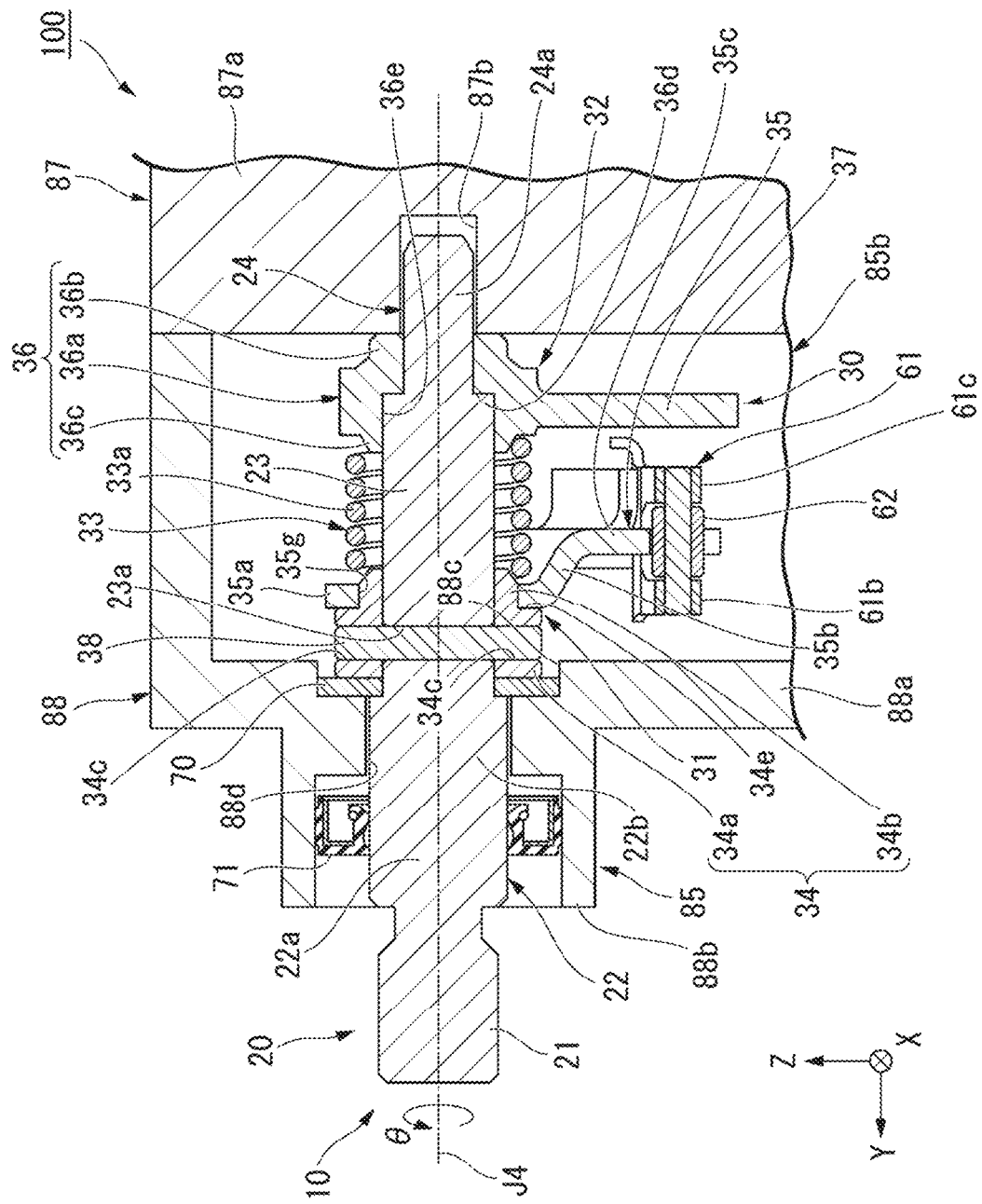
FIG. 2 is a cross-sectional view illustrating a part of the drive apparatus of the present embodiment.

As illustrated in FIG. 2, the second housing 85b has a first member 87 and a second member 88. The first member 87 and the second member 88 are separate members from each other. The second member 88 is fixed to the first member 87. In the present embodiment, the second housing 85b is configured by fixing the first member 87 and the second member 88. The second member 88 is located, for example, on the left side of the first member 87.

The first member 87 has a partition wall 87a. That is, the housing 85 has the partition wall 87a. The partition wall 87a is a wall portion that partitions the inside of the first housing 85a and the inside of the second housing 85b in the left-right direction. The partition wall 87a is located, for example, on the right side of the parking mechanism 10. A surface on the left side of the partition wall 87a constitutes at least a part of a surface located on the right side of an inner surface of the second housing 85b.

The first member 87 has a first hole portion 87b. That is, the housing 85 has the first hole portion 87b. The first hole portion 87b is, for example, a hole that is recessed on the right side from a surface on the left side of the partition wall 87a and has a bottom portion on the right side. Although not illustrated, the first hole portion 87b has, for example, a circular shape about a central axis J4 when viewed in the left-right direction. In the present embodiment, the central axis J4 extends in the left-right direction. The central axis J4 is, for example, parallel to a power axis J1.

The second member 88 is, for example, a box-shaped member that is open on the right side. An opening on the right side of the second member 88 is blocked by, for example, the partition wall 87a. The second member 88 has a left side wall portion 88a and a connecting cylindrical portion 88b. The left side wall portion 88a is located, for example, on the left side of a portion located in the second housing 85b of the parking mechanism 10. The left side wall portion 88a has a recess 88c recessed to the left side from a surface on the right side of the left side wall portion 88a. Although not illustrated, the recess 88c has, for example, a circular shape about the central axis J4 when viewed in the left-right direction.

The connecting cylindrical portion 88b projects to the left side from the left side wall portion 88a. The connecting cylindrical portion 88b is open on the left side. The connecting cylindrical portion 88b has a cylindrical shape about the central axis J4. An oil seal 11 is held inside the connecting cylindrical portion 88b. The oil seal 71 has an annular shape that surrounds a driven shaft 20, which will be described later.

The second member 88 has a second hole portion 88d. That is, the housing 85 has the second hole portion 88d. The second hole portion 88d is recessed to the left side from a surface on the right side of the left side wall portion 88a, for example. More specifically, the second hole portion 88d is recessed to the left side from a bottom surface of the recess 88c, for example. The bottom surface of the recess 88c is a surface that is located on the left side and faces the right side on an inner surface of the recess 88c. Although not illustrated, the second hole portion 88d has, for example, a circular shape about the central axis J4 when viewed in the left-right direction. For example, the second hole portion 88d penetrates the left side wall portion 88a in the left-right direction and connects the inside of the second housing 85b and the inside of the connecting cylindrical portion 88b. An inner diameter of the second hole portion 88d is smaller than, for example, an inner diameter of the first hole portion 87b, an inner diameter of the recess 88c, and an inner diameter of the connecting cylindrical portion 88b.

In the present embodiment, the electric actuator 90 is a drive source for driving the parking mechanism 10. As illustrated in FIG. 1, the electric actuator 90 is located, for example, outside the housing 85. The electric actuator 90 is fixed to, for example, an outer surface of the second housing 85b. The electric actuator 90 is connected to, for example, the connecting cylindrical portion 88b.

The power unit 80a is a portion that drives the drive apparatus 100. In the present embodiment, the power unit 80a is a motor. The power unit 80a has a rotor 81 and a stator 82. The rotor 81 has a power shaft 81a that can rotate around a power axis J1. The power axis J1 extends in the left-right direction, for example. The power shaft 81a has, for example, a columnar shape extending in the left-right direction about the power axis J1. For example, the power shaft 81a extends from the inside of the first housing 85a to the left side, penetrates the partition wall 87a in the left-right direction, and projects into the inside of the second housing 85b.

The transmission mechanism unit 80b is connected to the power unit 80a. The transmission mechanism unit 80b includes a reduction gear 83 and a differential 84. The reduction gear 83 is connected to the power shaft 81a. The reduction gear 83 reduces the rotation speed of the power unit 80a to increase the torque output from the power unit 80a in accordance with a reduction ratio. The reduction gear 83 transmits the torque output from the power unit 80a to the differential 84. The reduction gear 83 has a first gear 83a, a second gear 83b, a third gear 83c, and an intermediate shaft 83d. That is, the transmission mechanism unit 80b has the first gear 83a and the second gear 83b.

The first gear 83a is fixed to an outer peripheral surface of a portion that protrudes into the second housing 85b of the power shaft 81a. In this manner, the first gear 83a is fixed to the power unit 80a. The intermediate shaft 83d extends in the left-right direction about an intermediate axis J2, for example. The intermediate axis J2 is, for example, parallel to the power axis J1. The intermediate axis J2 is located further on the lower side than the power axis J1, for example. The second gear 83b and the third gear 83c are fixed to an outer peripheral surface of the intermediate shaft 83d. The second gear 83b and the third gear 83c are connected via the intermediate shaft 83d. The second gear 83b meshes with the first gear 83a. The intermediate shaft 83d, the second gear 83b, and the third gear 83c are rotatable about the intermediate axis J2.

The differential 84 is connected to the reduction gear 83. The differential 84 rotates the axle 86. The axle 86 rotates, for example, around an output axis J3 that extends parallel to the power axis J1. The output axis J3 is arranged at a position deviated from the power axis J1 and the intermediate axis J2 when viewed in the left-right direction, for example. The differential 84 has a ring gear 84a. The ring gear 84a meshes with the third gear 83c. The torque output from the power unit 80a is transmitted to the ring gear 84a via the reduction gear 83. An end portion on the lower side of the ring gear 84a is immersed in the oil O stored in the second housing 85b. When the ring gear 84a rotates, the oil O is scraped up. The scraped oil O is supplied to, for example, the reduction gear 83 and the differential 84 as lubricating oil.

Figure 3:
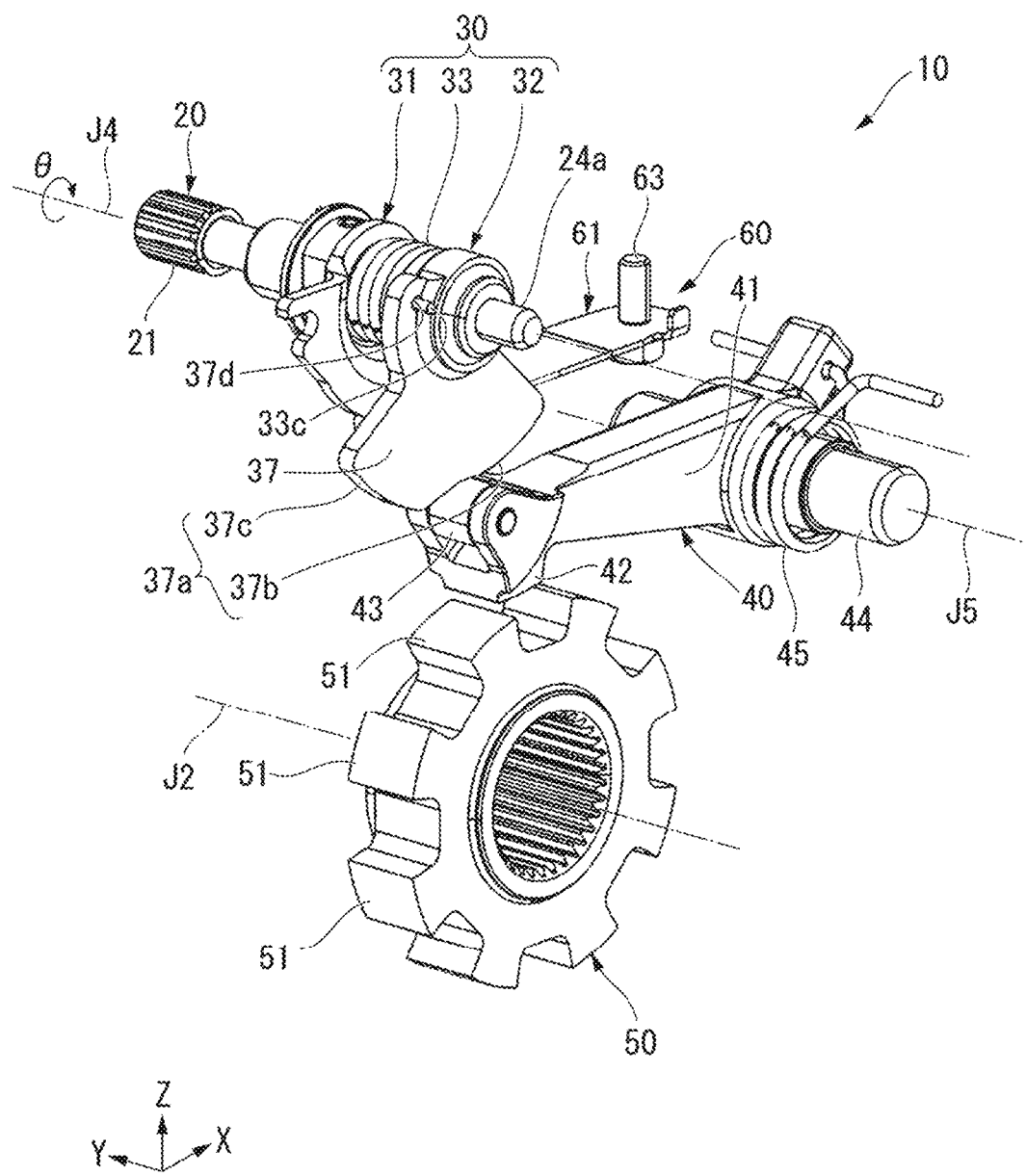
FIG. 3 is a perspective view illustrating a parking mechanism of the present embodiment.

In the present embodiment, the parking mechanism 10 is driven by the electric actuator 90 based on shift operation of a vehicle. A state of the parking mechanism 10 is switched between a locked state in which the rotation of the axle 86 is stopped and an unlocked state in which the rotation of the axle 86 is allowed by the electric actuator 90 as a power source. The parking mechanism 10 is in the locked state when the gear of the vehicle is parking, and is in the unlocked state when the gear of the vehicle is other than parking. A case where the gear of the vehicle is other than parking includes, for example, a case where the gear of the vehicle is drive, neutral, reverse, or the like. As illustrated in FIG. 3, the parking mechanism 10 includes the driven shaft 20, a movable portion 30, a pawl member 40, a parking gear 50, and a second elastic member 60.

The driven shaft 20 can rotate about the central axis J4 extending in the left-right direction. The driven shaft 20 has, for example, a columnar shape extending in the left-right direction about the central axis J4. Note that, in description of the parking mechanism 10 below, the radial direction about the central axis J4 may be simply referred to as the "radial direction", and the circumferential direction around the central axis J4 may be simply referred to as the "circumferential direction". In each diagram, the circumferential direction is indicated by an arrow θ as appropriate. The side traveling clockwise about the central axis J4 as viewed from the right side in the circumferential direction, that is, the side (+θ side) to which the arrow θ points is referred to as "first side in the circumferential direction", and the side traveling counterclockwise about the central axis J4 as viewed from the right side in the circumferential direction, that is, the side (−θ side) opposite to the side to which the arrow θ points is referred to as "second side in the circumferential direction".

Figure 4:
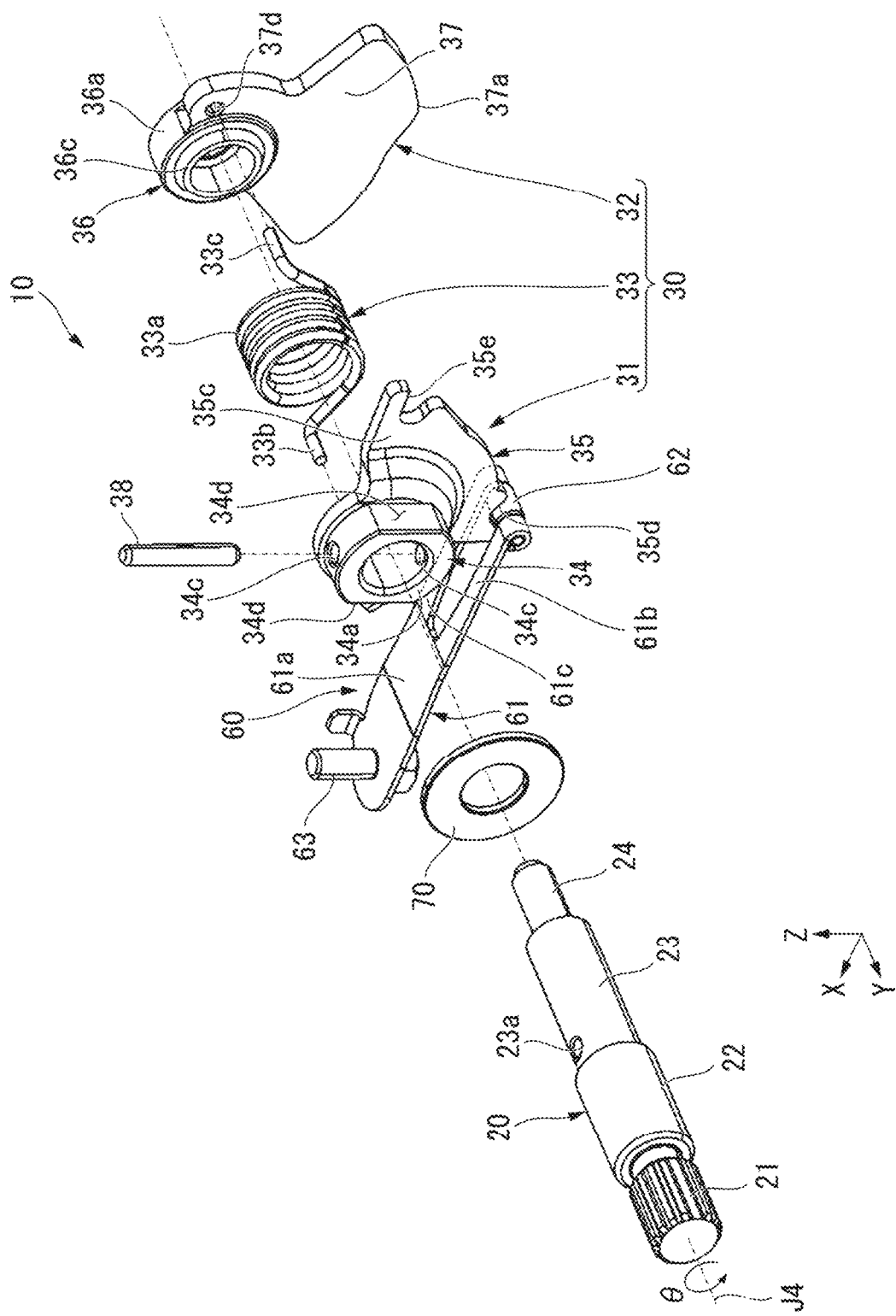
FIG. 4 is an exploded perspective view illustrating a part of the parking mechanism of the present embodiment.

As illustrated in FIG. 2, the driven shaft 20 protrudes to the outside of the housing 85 from, for example, the inside of the second housing 85b, through the inside of the recess 88c, the inside of the second hole portion 88d, and the inside of the connecting cylindrical portion 88b. As illustrated in FIGS. 2 and 4, the driven shaft 20 has a connected portion 21, a large diameter portion 22, a medium diameter portion 23, and a small diameter portion 24. The connected portion 21, the large diameter portion 22, the medium diameter portion 23, and the small diameter portion 24 are connected in this order from the left side to the right side.

The connected portion 21 is a portion connected to the electric actuator 90. As illustrated in FIG. 2, the connected portion 21 projects to the outside of the housing 85, for example. An end portion on the left side of the connected portion 21 is, for example, an end portion on the left side of the driven shaft 20. For example, a spline portion is provided on an outer peripheral surface of the connected portion 21. The connected portion 21 is connected to the electric actuator 90, for example, by the spline portion fitted into a spline groove provided in an output portion of the electric actuator 90.

In the present embodiment, the connected portion 21 is a portion located further on the left side than the movable portion 30 in the driven shaft 20. That is, in the present embodiment, the connected portion 21 which is a portion located further on the left side than the movable portion 30 in the driven shaft 20 is connected to the electric actuator 90 which is a drive source for rotating the driven shaft 20.

The large diameter portion 22 is connected to the right side of the connected portion 21. An outer diameter of the large diameter portion 22 is larger than, for example, an outer diameter of the connected portion 21. The dimension in the left-right direction of the large diameter portion 22 is larger than, for example, the dimension in the left-right direction of the connected portion 21. The large diameter portion 22 has a sealed portion 22a and a second supported portion 22b. That is, the driven shaft 20 has the sealed portion 22a and the second supported portion 22b.

The sealed portion 22a is, for example, a left side portion of the large diameter portion 22. The sealed portion 22a is located inside, for example, the connecting cylindrical portion 88b. An outer peripheral surface of the sealed portion 22a is in contact with an inner peripheral surface of the oil seal 71. The oil seal 71 seals a space between an outer peripheral surface of the sealed portion 22a and an inner peripheral surface of the connecting cylindrical portion 88b.

The second supported portion 22b is, for example, a right side portion of the large diameter portion 22. The second supported portion 22b is connected to the right side of the sealed portion 22a. The second supported portion 22b is inserted into the second hole portion 88d. An outer diameter of the second supported portion 22b is slightly smaller than an inner diameter of the second hole portion 88d. In the present embodiment, the second supported portion 22b is loosely fitted in the second hole portion 88d. In this manner, the second supported portion 22b is rotatably supported around the central axis J4 by an inner peripheral surface of the second hole portion 88d. That is, in the present embodiment, the second hole portion 88d functions as a bearing portion that rotatably supports the second supported portion 22b around the central axis J4. The second supported portion 22b is located between the connected portion 21 which is a portion connected to the electric actuator 90 as a drive source in the driven shaft 20 and the movable portion 30 in the left-right direction.

The medium diameter portion 23 is connected to the right side of the large diameter portion 22. An outer diameter of the medium diameter portion 23 is smaller than, for example, an outer diameter of the large diameter portion 22. The dimension in the left-right direction of the medium diameter portion 23 is larger than, for example, the dimension in the left-right direction of the large diameter portion 22. The medium diameter portion 23 is located, for example, inside the second housing 85b. An end portion on the left side of the medium diameter portion 23 is located, for example, inside the recess 88c. The medium diameter portion 23 has a pinning hole 23a that penetrates the medium diameter portion 23 in the radial direction. The pinning hole 23a is provided, for example, in a portion closer to the left side of the medium diameter portion 23. As illustrated in FIG. 4, the pinning hole 23a is, for example, a circular hole.

The small diameter portion 24 is connected to the right side of the medium diameter portion 23. An outer diameter of the small diameter portion 24 is smaller than, for example, an outer diameter of the medium diameter portion 23 and an outer diameter of the connected portion 21. As illustrated in FIG. 2, the small diameter portion 24 has a first supported portion 24a. That is, the driven shaft 20 has the first supported portion 24a. The first supported portion 24a is, for example, a right side portion of the small diameter portion 24. An end portion on the right side of the first supported portion 24a is, for example, an end portion on the right side of the driven shaft 20. The first supported portion 24a is located further on the right side than the movable portion 30.

The first supported portion 24a is inserted into the first hole portion 87b. An outer diameter of the first supported portion 24a is slightly smaller than an inner diameter of the first hole portion 87b. In the present embodiment, the first supported portion 24a is loosely fitted in the first hole portion 87b. In this manner, the first supported portion 24a is rotatably supported around the central axis J4 by an inner peripheral surface of the first hole portion 87b. That is, in the present embodiment, the first hole portion 87b functions as a bearing portion that rotatably supports the first supported portion 24a around the central axis J4.

The movable portion 30 is a portion that rotates with the rotation of the driven shaft 20. In the present embodiment, the movable portion 30 rotates in the circumferential direction around the central axis J4 as the driven shaft 20 rotates. That is, in the present embodiment, the circumferential direction around the central axis J4 corresponds to a rotational direction of the movable portion 30. As illustrated in FIG. 4, the movable portion 30 includes a fixed member 31, a contact member 32, and a first elastic member 33.

The fixed member 31 is fixed to the driven shaft 20. The fixed member 31 has a cylindrical portion 34 and a flange portion 35. The cylindrical portion 34 and the flange portion 35 are, for example, separate members from each other and are fixed to each other. The cylindrical portion 34 has a substantially cylindrical shape about the central axis J4. The cylindrical portion 34 is open on both sides in the left-right direction. As illustrated in FIG. 2, the medium diameter portion 23 of the driven shaft 20 is caused to pass in the left-right direction through the inside of the cylindrical portion 34. The cylindrical portion 34 has a first portion 34a and a second portion 34b.

The first portion 34a is, for example, a left side portion of the cylindrical portion 34. The second portion 34b is, for example, a right side portion of the cylindrical portion 34. The second portion 34b is connected to the right side of the first portion 34a. An outer diameter of the second portion 34b is smaller than an outer diameter of the first portion 34a. A step having a step surface 34e is provided between the first portion 34a and the second portion 34b in the left-right direction. The step surface 34e is, for example, a surface facing the right side and orthogonal to the left-right direction, and is an end surface on the right side of the first portion 34a.

The first portion 34a has a pinning hole 34c. A pair of the pinning holes 34c are provided so as to sandwich the central axis J4 in the radial direction. The pinning hole 34c penetrates from an inner peripheral surface to an outer peripheral surface of the first portion 34a. The pinning hole 34c is, for example, a circular hole. The first portion 34a is fixed to the medium diameter portion 23 by, for example, a pin 38 passing through the pinning hole 34c. In this manner, the cylindrical portion 34 is fixed to the driven shaft 20, and the fixed member 31 is fixed to the driven shaft 20.

The pin 38 has a columnar shape extending in the radial direction about the central axis J4. The pin 38 passes from a first one of the pair of pinning holes 34c of the cylindrical portion 34 through the pinning hole 23a of the driven shaft 20, and extends to a second one of the pair of pinning holes 34c. The pin 38 is fitted and fixed in each of the pinning holes 23a and 34c. As the pin 38 is fitted into each of the pinning holes 23a and 34c, a relative rotation around the central axis J4 and a relative movement in the left-right direction of the driven shaft 20 and the fixed member 31 are prevented. As illustrated in FIG. 4, a pair of flat surfaces 34d are provided on an outer peripheral surface of the first portion 34a. The pair of flat surfaces 34d are rectangular surfaces orthogonal to the radial direction, and are arranged on opposite sides to each other with the central axis J4 in between.

As illustrated in FIG. 2, a washer 70 is provided between an end portion on the left side of the cylindrical portion 34 and the bottom surface of the recess 88c. The washer 70 has, for example, an annular shape about the central axis J4 and surrounding the medium diameter portion 23 of the driven shaft 20. The washer 70 has a plate shape with a plate surface facing in the left-right direction. An inner diameter of the washer 70 is smaller than, for example, an outer diameter of the large diameter portion 22. A surface on the left side of the washer 70 is in contact with, for example, the bottom surface of the recess 88c. A surface on the right side of the washer 10 is in contact with, for example, an end surface on the left side of the cylindrical portion 34.

The flange portion 35 is fixed to the cylindrical portion 34. The flange portion 35 is made by, for example, bending a plate-shaped member. The flange portion 35 has a base portion 35a, a connecting portion 35b, and an outer edge portion 35c. That is, the fixed member 31 has the outer edge portion 35c.

The base portion 35a is a portion fixed to the cylindrical portion 34. The base portion 35a has a fixing hole 35g that penetrates the base portion 35a in the left-right direction. The second portion 34b is fitted into the fixing hole 35g. An end portion on the right side of the second portion 34b projects further to the right side than the fixing hole 35g. An outer diameter of a portion protruding further to the right side than the fixing hole 35g of the second portion 34b becomes smaller toward the right side, for example.

Figure 5:
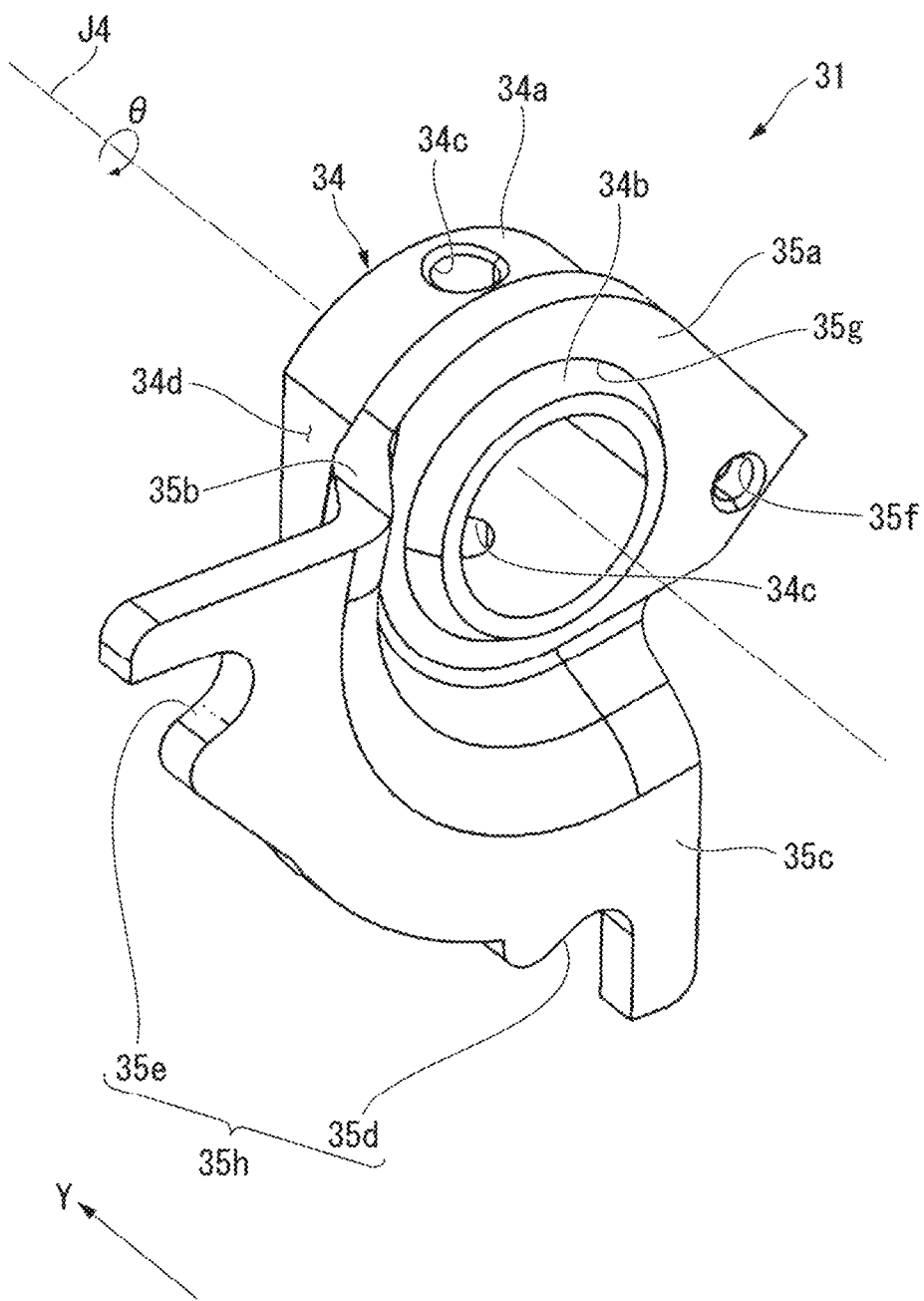
FIG. 5 is a perspective view illustrating a fixed member of the present embodiment.

A surface on the left side of the base portion 35a is in contact with the step surface 34e. The base portion 35a is fixed to the cylindrical portion 34 by welding, for example. Note that the base portion 35a may be fixed to the cylindrical portion 34 by press-fitting the second portion 34b into the fixing hole 35g. As illustrated in FIG. 5, the base portion 35a has an insertion hole 35f recessed to the left side from a surface on the right side of the base portion 35a. The insertion hole 35f is, for example, a circular hole that penetrates the base portion 35a in the left-right direction.

The connecting portion 35b is a portion connecting the base portion 35a and the outer edge portion 35c. The connecting portion 35b projects radially outward and diagonally to the right from a part in the circumferential direction of the base portion 35a. The connecting portion 35b projects from, for example, a portion at a circumferential position different from a circumferential position of the insertion hole 35f of the base portion 35a.

The outer edge portion 35c projects radially outward from an end portion on the radially outer side of the connecting portion 35b. The outer edge portion 35c is located outside the cylindrical portion 34 in the radial direction about the central axis J4. The outer edge portion 35c extends in the circumferential direction, for example. The dimension in the circumferential direction of the outer edge portion 35c becomes larger from the inside in the radial direction to the outside in the radial direction, for example. As illustrated in FIG. 2, in the present embodiment, the outer edge portion 35c is located further on the right side than the cylindrical portion 34. That is, in the present embodiment, the position in the left-right direction of the cylindrical portion 34 and the position in the left-right direction of the outer edge portion 35c are different from each other. Further, in the present embodiment, the position in the left-right direction of the cylindrical portion 34 is a position farther in the left-right direction from the contact member 32 than the position in the left-right direction of the outer edge portion 35c.

Figure 6:
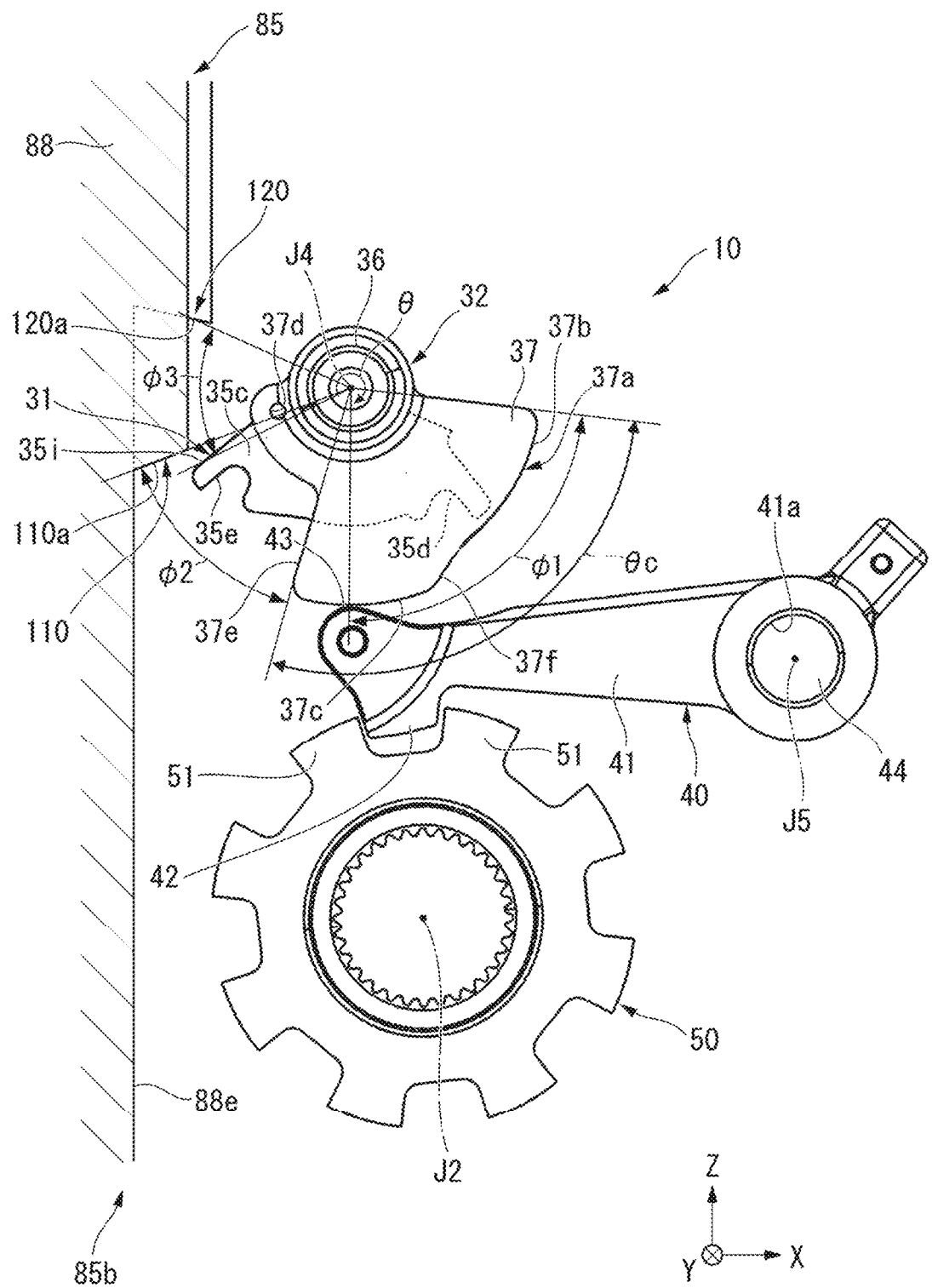
FIG. 6 is a view of the parking mechanism of the present embodiment as viewed from the right side.

As illustrated in FIG. 6, in the present embodiment, a side surface on the first side in the circumferential direction (+θ side) of the outer edge portion 35c is a flat third facing surface 35i facing the first side in the circumferential direction. That is, the fixed member 31 has the flat third facing surface 35i facing in the circumferential direction (rotational direction). The third facing surface 35i extends in a direction inclined in the circumferential direction with respect to the radial direction, for example. The third facing surface 35i is located further on the second side in the circumferential direction (−θ side) toward the radially outer side. The third facing surface 35i is a circumferential side surface of the fixed member 31.

As illustrated in FIG. 5, the fixed member 31 has a groove portion 35h. In the present embodiment, the groove portion 35h is provided on the outer edge portion 35c. The groove portion 35h is recessed to the radially inside from a radially outer peripheral edge of the outer edge portion 35c, for example. In the present embodiment, a plurality of the groove portions 35h are provided. The groove portion 35h includes a first groove portion 35d and a second groove portion 35e. The first groove portion 35d and the second groove portion 35e are separated from each other in the circumferential direction. The second groove portion 35e is arranged, for example, away from the first groove portion 35d to the first side in the circumferential direction. The first groove portion 35d is provided, for example, in an end portion on the second side in the circumferential direction of the outer edge portion 35c. The second groove portion 35e is provided, for example, in an end portion on the first side in the circumferential direction of the outer edge portion 35c.

As illustrated in FIG. 2, the contact member 32 is connected to the fixed member 31 via the first elastic member 33. In this manner, the contact member 32 is connected to the driven shaft 20 via the first elastic member 33 and the fixed member 31. The contact member 32 can rotate relative to the driven shaft 20 and the fixed member 31 in the circumferential direction (rotational direction) around the central axis J4 by elastic deformation of the first elastic member 33. The contact member 32 is located, for example, on the right side in a manner separated from the fixed member 31. That is, in the present embodiment, the fixed member 31 and the contact member 32 are arranged at a distance along the left-right direction. The contact member 32 projects radially outward from the driven shaft 20. The contact member 32 is, for example, a single member. The contact member 32 has a cylindrical portion 36 and a cam flange portion 37.

The cylindrical portion 36 has a cylindrical shape about the central axis J4. The cylindrical portion 36 is open on both sides in the left-right direction. The cylindrical portion 36 has a through hole 36e through which the driven shaft 20 passes in the left-right direction. That is, the contact member 32 has the through hole 36e through which the driven shaft 20 passes in the left-right direction. Inside the through hole 36e, an end portion on the right side of the medium diameter portion 23 and a left side portion of the small diameter portion 24 are located. A step having a step surface 36d is provided on an inner peripheral surface of the through hole 36e. The step surface 36d is a surface facing the left side. For example, the step surface 36d is in contact with a step surface of a step provided between the medium diameter portion 23 and the small diameter portion 24 in the left-right direction.

The cylindrical portion 36 has a base portion 36a, a first protruding portion 36b connected to the right side of the base portion 36a, and a second protruding portion 36c connected to the left side of the base portion 36a. The first protruding portion 36b protrudes to the right side from the base portion 36a. An outer diameter of the first protruding portion 36b is smaller than an outer diameter of the base portion 36a. An end surface on the right side of the first protruding portion 36b is, for example, an end surface on the right side of the contact member 32 and is in contact with a surface on the left side of the partition wall 87a. The second protruding portion 36c protrudes to the left side from the base portion 36a. An outer diameter of the second protruding portion 36c is smaller than an outer diameter of the base portion 36a. An outer diameter of the second protruding portion 36c becomes smaller toward the left side, for example.

The cam flange portion 37 extends radially outward from the base portion 36a. The cam flange portion 37 extends to the lower side from, for example, the base portion 36a. As illustrated in FIG. 4, the cam flange portion 37 has a substantially fan shape when viewed in the left-right direction. A part of a radially outer surface of the cam flange portion 37 is a cam surface 37a. That is, the contact member 32 has the cam surface 37a. The cam surface 37a extends in the circumferential direction. The cam surface 37a faces the lower side, for example. As illustrated in FIGS. 3 and 6, the cam surface 37a is a surface in contact with the pawl member 40. That is, in the present embodiment, the contact member 32 comes into contact with the pawl member 40 via the cam surface 37a. The cam surface 37a is located, for example, radially outer side than a radially outer edge of the outer edge portion 35c.

As illustrated in FIG. 6, the cam surface 37a has a first cam portion 37b, a second cam portion 37c, and a connecting cam portion 37f. The first cam portion 37b and the second cam portion 37c extend in the circumferential direction. The first cam portion 37b and the second cam portion 37c have, for example, an arc shape about the central axis J4. The first cam portion 37b and the second cam portion 37c are connected in the circumferential direction via the connecting cam portion 37f. The second cam portion 37c is connected to, for example, the first side in the circumferential direction of the first cam portion 37b. The second cam portion 37c is located radially outer side than the first cam portion 37b.

The connecting cam portion 37f is located between the first cam portion 37b and the second cam portion 37c in the circumferential direction. The connecting cam portion 37f connects an end portion on the first side in the circumferential direction (+e side) of the first cam portion 37b and an end portion on the second side in the circumferential direction (−θ side) of the second cam portion 37c in the circumferential direction. The connecting cam portion 37f is an inclined surface that is inclined with respect to the circumferential direction. The radial position of the connecting cam portion 37f is located radially outward toward the first side in the circumferential direction (+θ side).

In the present embodiment, the cam surface 37a has a portion whose circumferential position is the same as that of the first groove portion 35d. That is, in the present embodiment, the circumferential position around the central axis J4 in at least a part of the groove portion 35h is included in the circumferential position around the central axis J4 on the cam surface 37a. In the present embodiment, the circumferential position of the cam surface 37a is in a circumferential range indicated by θc in FIG. 6. The circumferential position of the cam surface 37a includes, for example, the circumferential position of a portion closer to the second side in the circumferential direction of the outer edge portion 35c.

As illustrated in FIG. 4, the cam flange portion 37 has an insertion hole 37d recessed from a surface on the left side of the cam flange portion 37 to the right side. The insertion hole 37d is, for example, a circular hole that penetrates the cam flange portion 37 in the left-right direction. The insertion hole 37d is provided, for example, in a portion not provided with the cam surface 37a on the radially outer surface of the cam flange portion 37. The insertion hole 37d is located, for example, further on the first side in the circumferential direction than the cam surface 37a. The insertion hole 37d is a portion to which the first elastic member 33 is connected of the contact member 32.

As illustrated in FIG. 6, in the present embodiment, a side surface on the first side in the circumferential direction (+θ side) of the cam flange portion 37 is a flat first facing surface 37e facing the first side in the circumferential direction. That is, the contact member 32 has the flat first facing surface 37e facing in the circumferential direction (rotational direction). The first facing surface 37e is, for example, a flat surface orthogonal to the circumferential direction. The first facing surface 37e extends in the radial direction. The first facing surface 37e is a circumferential side surface of the contact member 32. The first facing surface 37e is located radially outer side than the insertion hole 37d. That is, the first facing surface 37e is located radially outer side than a portion to which the first elastic member 33 is connected of the contact member 32. The first facing surface 37e is a portion facing a stopper portion 110, which will be described later, of the contact member 32.

The first elastic member 33 connects the fixed member 31 and the contact member 32. As illustrated in FIGS. 2 and 4, in the present embodiment, the first elastic member 33 is a coil spring that extends in the left-right direction and surrounds the driven shaft 20. The first elastic member 33 is, for example, a torsion coil spring. That is, in the present embodiment, the first elastic member 33 can be elastically deformed in the circumferential direction. The first elastic member 33 is elastically deformed in the circumferential direction by the relative rotation of the fixed member 31 and the contact member 32 in the circumferential direction.

In the present embodiment, the medium diameter portion 23 passes through the inside of the first elastic member 33 in the left-right direction. The first elastic member 33 is located between the fixed member 31 and the contact member 32 in the left-right direction. As illustrated in FIG. 4, the first elastic member 33 has an elastic member main body 33a and inserted portions 33b and 33c.

The elastic member main body 33a is a portion formed by spirally winding a wire rod constituting the first elastic member 33 around the central axis J4. As illustrated in FIG. 2, a portion protruding further to the right side than the fixing hole 35g of the second portion 34b of the cylindrical portion 34 is inserted on an inner side of an end portion on the left side of the elastic member main body 33a. In this manner, it is possible to prevent the first elastic member 33 from being displaced in the radial direction with respect to the fixed member 31. In the present embodiment, since an outer diameter of the portion protruding further to the right side than the fixing hole 35g of the second portion 34b becomes smaller toward the right side, the second portion 34b can be easily inserted into the inner side of the end portion on the left side of the elastic member main body 33a.

The second protruding portion 36c of the cylindrical portion 36 is inserted into an inner side of an end portion on the right side of the elastic member main body 33a. In this manner, it is possible to prevent the first elastic member 33 from being displaced in the radial direction with respect to the contact member 32. In the present embodiment, since an outer diameter of the second protruding portion 36c is smaller than an outer diameter of the base portion 36a, the outer diameter of the second protruding portion 36c can be made relatively small, and the second protruding portion 36c can be easily inserted into the inner side of the end portion on the right side of the elastic member main body 33a. Further, in the present embodiment, since an outer diameter of the second protruding portion 36c becomes smaller toward the left side, the second protruding portion 36c can be more easily inserted into the inner side of the end portion on the right side of the elastic member main body 33a. A part of a left side portion of the elastic member main body 33a is located radially inside the outer edge portion 35c. That is, a part of the first elastic member 33 overlaps with the outer edge portion 35c when viewed in the radial direction about the central axis J4.

As illustrated in FIG. 4, the inserted portion 33b extends from an end portion on the left side of the wire rod constituting the elastic member main body 33a to the left side. The inserted portion 33b is inserted into the insertion hole 35f of the fixed member 31. In this manner, the first elastic member 33 is attached to the fixed member 31. In the present embodiment, the first elastic member 33 is attached to the driven shaft 20 via the fixed member 31. The inserted portion 33c extends from an end portion on the right side of the wire rod constituting the elastic member main body 33a to the right side. The inserted portion 33c is inserted into the insertion hole 37d of the contact member 32. In this manner, the first elastic member 33 is attached to the contact member 32.

As illustrated in FIG. 3, the pawl member 40 is located, for example, on the lower side of the movable portion 30. In the present embodiment, the pawl member 40 is rotatably supported by a support shaft 44. The support shaft 44 has, for example, a columnar shape extending in the left-right direction about a rotation axis J5 parallel to the power axis J1. The rotation axis J5 is located, for example, further on the front side and the lower side than the central axis J4. The rotation axis J5 is located, for example, further on the front side and the upper side than the intermediate axis J2. Although not illustrated, an end portion on the right side of the support shaft 44 is supported by being fitted into a hole portion provided in the partition wall 87a. An end portion on the left side of the support shaft 44 is fitted and supported in a hole portion provided on the left side wall portion 88a.

A torsion coil spring 45 is mounted on the support shaft 44. One end of the torsion coil spring 45 is fixed to the pawl member 40. Although not illustrated, the other end of the torsion coil spring 45 is fixed to the partition wall 87a. The torsion coil spring 45 applies an elastic force toward the first side in the circumferential direction (+θ direction) to the pawl member 40.

The pawl member 40 has an arm portion 41, a claw portion 42, and a roller 43. The arm portion 41 extends from the support shaft 44 to the rear side (−X side). As illustrated in FIG. 6, a hole portion 41a that penetrates the arm portion 41 in the left-right direction is provided in an end portion on the front side of the arm portion 41. The support shaft 44 passes through the hole portion 41a in the left-right direction. An end portion on the rear side of the arm portion 41 is located on the lower side of the cam surface 37a.

The claw portion 42 projects to the lower side from an end portion on the rear side (−X side) of the arm portion 41. The roller 43 is attached to the upper side in the end portion on the rear side of the arm portion 41. In the present embodiment, the roller 43 is a portion that is in contact with the movable portion 30. The roller 43 is attached to the arm portion 41 so as to be rotatable around a rotation axis extending in the left-right direction. The roller 43 is in contact with the cam surface 37a from the lower side.

The pawl member 40 moves with the rotation of the movable portion 30. In the present embodiment, the pawl member 40 swings about the rotation axis J5 as the contact member 32 rotates around the central axis J4. In this manner, an end portion on the rear side of the pawl member 40 moves in the vertical direction as the contact member 32 rotates around the central axis J4. In the present embodiment, since the pawl member 40 receives an elastic force toward the first side in the circumferential direction by the torsion coil spring 45, the roller 43 provided in the end portion on the rear side of the pawl member 40 receives a force toward the upper side from the torsion coil spring 45, and is pressed against the cam surface 37a from the lower side.

In the present embodiment, the parking gear 50 is located on the lower side of the pawl member 40. More specifically, the parking gear 50 is located on the lower side of the claw portion 42. In the present embodiment, the parking gear 50 is not located on an extension line of the driven shaft 20. That is, in the present embodiment, the driven shaft 20 is located outside a region where the parking gear 50 is provided when viewed in the left-right direction.

As illustrated in FIG. 1, the parking gear 50 is fixed, for example, to an end portion on the left side of the intermediate shaft 83d. In this manner, in the present embodiment, the parking gear 50 is fixed to the second gear 83b via the intermediate shaft 83d. The parking mechanism 10 is attached to the transmission mechanism unit 80b via the parking gear 50. The parking gear 50 can rotate around the intermediate axis J2. Note that the parking gear 50 may be fixed to the second gear 83b via the third gear 83c, or may be directly fixed to the second gear 83b.

As illustrated in FIGS. 3 and 6, the parking gear 50 has a plurality of teeth 51 at intervals around the intermediate axis J2. The claw portion 42 can be inserted between the teeth 51. In this manner, the claw portion 42 can be meshed with the parking gear 50.

As illustrated in FIG. 4, the second elastic member 60 has a leaf spring portion 61 and a roller 62. The leaf spring portion 61 has a plate shape in which a plate surface faces in the vertical direction. The leaf spring portion 61 extends in the front-rear direction. An end portion on the front side of the leaf spring portion 61 is fixed to the housing 85 by, for example, a screw 63. A portion located on the rear side of the leaf spring portion 61 is located on the lower side of the fixed member 31. The portion located on the rear side of the leaf spring portion 61 can be elastically displaced in the vertical direction with the end portion on the front side of the leaf spring portion 61 fixed by the screw 63 as a fulcrum.

The leaf spring portion 61 has a base portion 61a and a pair of arm portions 61b and 61c. The base portion 61a is, for example, a front side portion of the leaf spring portion 61. The base portion 61a is fixed to the housing 85 by, for example, the screw 63. The pair of arm portions 61b and 61c extend to the rear side from an end portion on the rear side of the base portion 61a. The pair of arm portions 61b and 61c are arranged side by side at intervals in the left-right direction. The arm portion 61c is located on the right side of the arm portion 61b. The position in the left-right direction between the pair of arm portions 61b and 61c in the left-right direction is, for example, the same as the position in the left-right direction of the outer edge portion 35c. For example, the outer edge portion 35c passes in the vertical direction between the pair of arm portions 61b and 61c in the left-right direction.

The roller 62 is rotatable about a rotation axis extending in the left-right direction. The roller 62 is attached to an end portion on the rear side of the leaf spring portion 61. The roller 62 extends in the left-right direction. The roller 62 connects end portions on the rear side of the pair of arm portions 61b and 61c to each other. An end portion on the left side of the roller 62 is rotatably supported by the end portion on the rear side of the arm portion 61b. An end portion on the right side of the roller 62 is rotatably supported by the end portion on the rear side of the arm portion 61c. The roller 62 is located on the lower side of the outer edge portion 35c. The roller 62 is in contact with a radially outer surface of the outer edge portion 35c.

The roller 62 can be fitted into the groove portion 35h, and can be hooked in the circumferential direction around the central axis J4 on the groove portion 35h. In this manner, the second elastic member 60 is hooked in the circumferential direction around the central axis J4 on the groove portion 35h. FIG. 4 illustrates, for example, a state in which the roller 62 is fitted into the first groove portion 35d and is hooked in the circumferential direction.

FIG. 3 illustrates a case where the parking mechanism 10 is in the unlocked state in which the axle 86 is allowed to rotate. In the unlocked state, the claw portion 42 of the pawl member 40 is in a state of being separated to the upper side from the parking gear 50, and the claw portion 42 is not located between the teeth 51. That is, the pawl member 40 is located at a non-parking position where the claw portion 42 is separated from the parking gear in the unlocked state. In this state, the parking gear 50 can rotate around the intermediate axis J2, and each gear of the reduction gear 83 can also rotate. For this reason, the rotation from the power unit 80a is transmitted to the axle 86 via the reduction gear 83 and the differential 84, and the axle 86 can rotate. In the unlocked state, the roller 62 is hooked in the circumferential direction on the first groove portion 35d. That is, in a case where a rotation angle of the driven shaft 20 is a rotation angle that causes the pawl member 40 to be at the non-parking position, the second elastic member 60 is hooked on the first groove portion 35d. In the unlocked state, the roller 43 of the pawl member 40 is in contact with the first cam portion 37b.

In the unlocked state, when the driven shaft 20 is rotated to the second side in the circumferential direction (−θ direction) by the electric actuator 90, the movable portion 30 is also rotated to the second side in the circumferential direction together with the driven shaft 20. When the contact member 32 rotates to the second side in the circumferential direction from the unlocked state, a portion of the cam surface 37a in contact with the roller 43 changes from the first cam portion 37b to the second cam portion 37c, as illustrated in FIG. 6. Since the second cam portion 37c is located radially outer side than the first cam portion 37b, the roller 43 is pushed to the lower side by the second cam portion 37c, and the end portion on the rear side of the pawl member 40 is moved to the lower side. In this manner, the claw portion 42 enters between the teeth 51 of the parking gear 50 and meshes with the parking gear 50. That is, the position of the pawl member 40 becomes the parking position where the claw portion 42 meshes with the parking gear 50.

When the claw portion 42 meshes with the parking gear 50, the rotation around the intermediate axis J2 of the parking gear 50 is blocked. For this reason, the rotation of the intermediate shaft 83d, the second gear 83b, and the third gear 83c to which the parking gear 50 is fixed is prevented. In this manner, the parking mechanism 10 is in the locked state in which the rotation of the axle 86 is blocked. In the locked state, the roller 62 is hooked in the circumferential direction on the second groove portion 35e. That is, in a case where a rotation angle of the driven shaft 20 is a rotation angle that causes the pawl member 40 to be at the parking position, the second elastic member 60 is hooked on the second groove portion 35e.

In the locked state, when the driven shaft 20 is rotated to the first side in the circumferential direction (+θ direction) by the electric actuator 90, the movable portion 30 is also rotated to the first side in the circumferential direction together with the driven shaft 20. When the contact member 32 rotates to the first side in the circumferential direction from the locked state, a portion of the cam surface 37a in contact with the roller 43 changes from the second cam portion 37c to the first cam portion 37b. In this manner, the end portion on the rear side of the pawl member 40 is moved to the upper side by the elastic force of the coil spring 45, and the claw portion 42 is separated to the upper side from between the teeth 51 of the parking gear 50. That is, the position of the pawl member 40 becomes the non-parking position where the claw portion 42 is separated from the parking gear 50. In this manner, the parking mechanism 10 is in the unlocked state again.

As described above, the position of the pawl member 40 is switched between the parking position and the non-parking position as the movable portion 30 rotates as the driven shaft 20 is rotated by the electric actuator 90. In this manner, the parking mechanism 10 is switched between the locked state and the unlocked state.

As illustrated in FIG. 6, the parking mechanism 10 includes the stopper portion 110. In the present embodiment, the stopper portion 110 is provided on an inner wall of the housing 85. More specifically, the stopper portion 110 is provided on a portion different from the partition wall 87a on an inner wall of the second housing 85b. In the present embodiment, the stopper portion 110 is provided on a rear wall portion 88e located on the rear side (−X side) of the inner wall of the second housing 85b. The stopper portion 110 projects further to the front side (+X side) than a portion located on the lower side of the stopper portion 110 on the rear wall portion 88e. The stopper portion 110 is composed of, for example, a step portion provided on the rear wall portion 88e.

Figure 7:
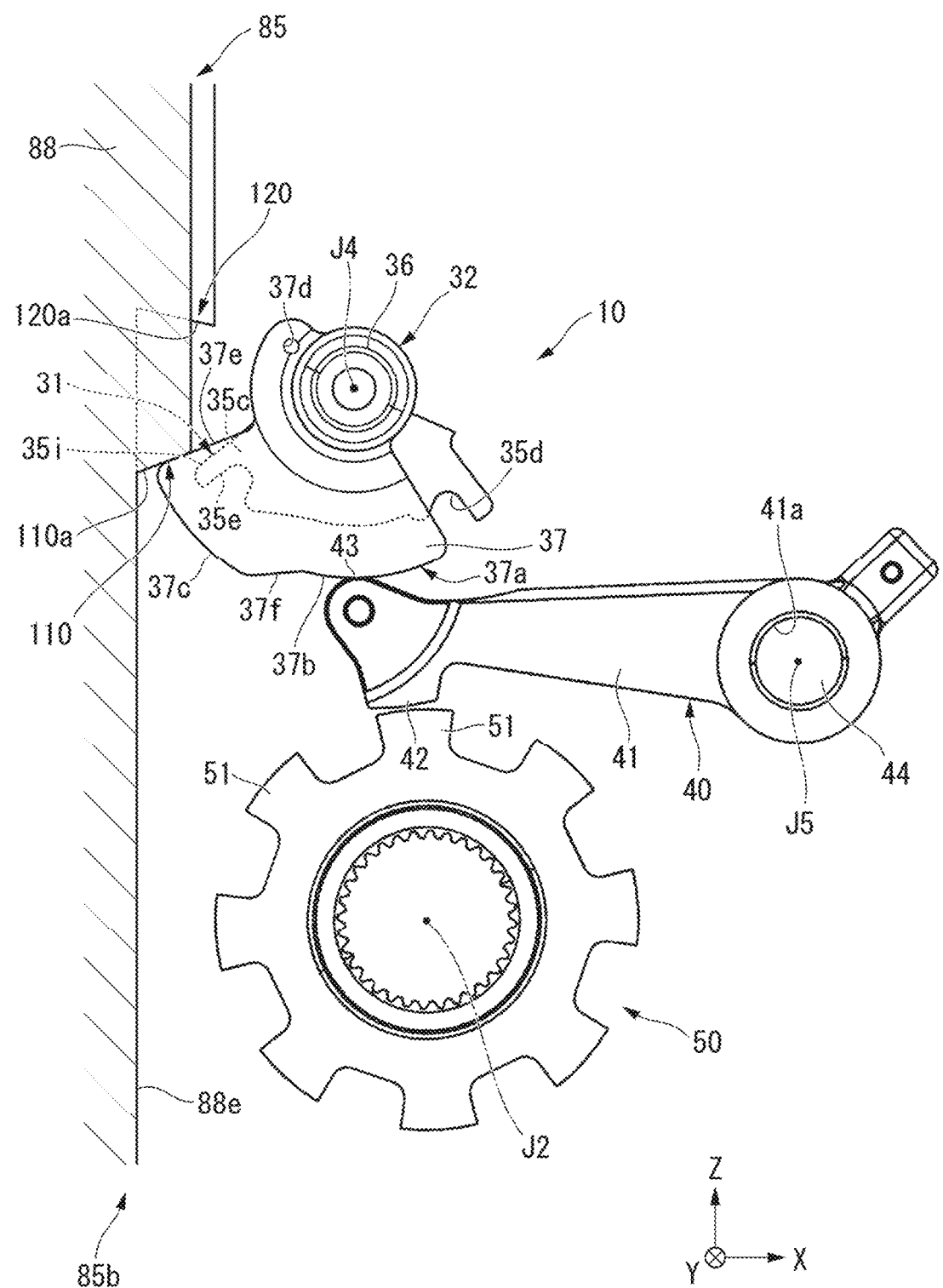
FIG. 7 is a view of the parking mechanism of the present embodiment as viewed from the right side, and is a view illustrating a state in which a contact member is in contact with a stopper portion.

In the present embodiment, the stopper portion 110 has a flat second facing surface 110a facing the first facing surface 37e in the circumferential direction (rotational direction). That is, the stopper portion 110 faces the first facing surface 37e, which is the circumferential side surface of the contact member 32, in the circumferential direction. The second facing surface 110a is a step surface of the step portion provided on the rear wall portion 88e. The second facing surface 110a is a surface facing the lower side. More specifically, the second facing surface 110a faces the lower side and diagonally the front side (+X side). The second facing surface 110a faces the second side in the circumferential direction (−θ side). As illustrated in FIG. 7, the first facing surface 37e and the second facing surface 110a can be in contact with each other. That is, the stopper portion 110 can come into contact with the movable portion 30 in the rotational direction (circumferential direction) of the movable portion 30. Further, the contact member 32 can come into contact with the stopper portion 110 in the rotational direction (circumferential direction).

The stopper portion 110 faces the contact member 32 at a distance in the circumferential direction (rotational direction) when the position of the pawl member 40 is switched between the parking position and the non-parking position. That is, when the position of the pawl member 40 is switched between the parking position and the non-parking position, the stopper portion 110 and the contact member 32 do not come into contact with each other. Note that, that "the stopper portion 110 faces the contact member 32 at a distance in the rotational direction when the position of the pawl member 40 is switched between the parking position and the non-parking position" means that the contact member 32 only needs not to come into contact with the stopper portion 110 within a range in which the contact member 32 rotates when the position of the pawl member 40 is switched between the parking position and the non-parking position.

In the present embodiment, the stopper portion 110 is located on the first side in the circumferential direction (+θ side) of the contact member 32. That is, in the present embodiment, the stopper portion 110 is located on the side to which the contact member 32 moves when the position of the pawl member 40 is switched from the parking position to the non-parking position in the circumferential direction (rotational direction) with respect to the contact member 32.

As illustrated in FIG. 6, an angle φ1 in the circumferential direction between an end portion on the far side (−θ side) in the circumferential direction from the stopper portion 110 of the cam surface 37a and a portion in contact with the pawl member 40 of the cam surface 37a is larger than an angle φ2 in the circumferential direction between an end portion on the close side (+θ side) in the circumferential direction to the stopper portion 110 of the cam surface 37a and the stopper portion 110. In the present embodiment, the end portion on the far side in the circumferential direction from the stopper portion 110 of the cam surface 37a is an end portion on the second side in the circumferential direction (−θ side) of the first cam portion 37b. In the present embodiment, the end portion on the close side in the circumferential direction to the stopper portion 110 of the cam surface 37a is an end portion on the first side in the circumferential direction (+θ side) of the second cam portion 37c. In the present embodiment, the angle φ2 is an angle in the circumferential direction between the first facing surface 37e and the second facing surface 110a. That is, in the present embodiment, the angle φ2 is an angle in the circumferential direction between the stopper portion 110 and the contact member 32.

Figure 8:
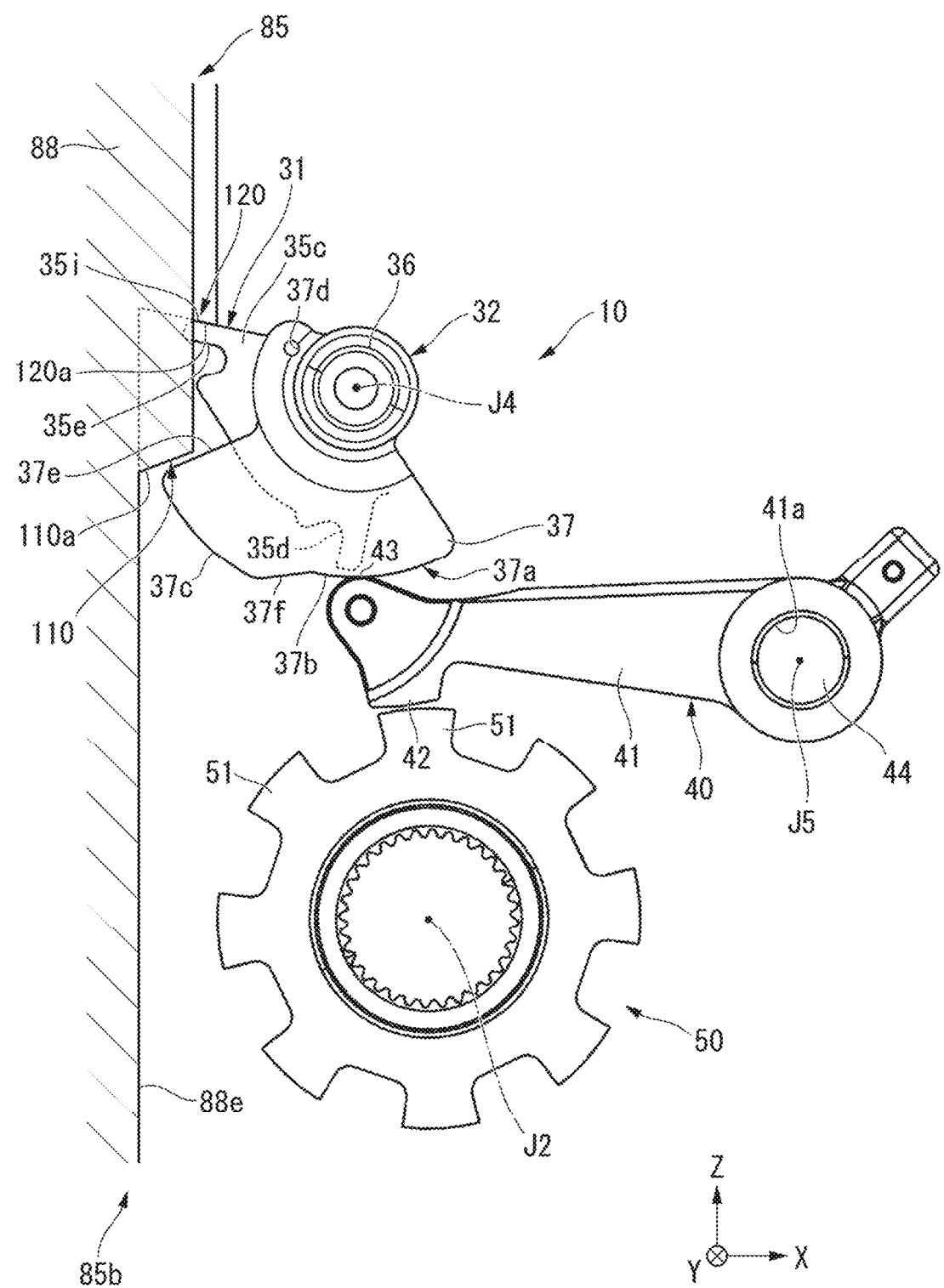
FIG. 8 is a view of the parking mechanism of the present embodiment as viewed from the right side, and is a view illustrating a state in which the fixed member is caused to butt against a butting portion.

In the present embodiment, the electric actuator 90 that drives the parking mechanism 10 acquires a rotation angle range of the driven shaft 20 required to switch the position of the pawl member 40 between the parking position and the non-parking position by performing butting control. As illustrated in FIG. 8, in the butting control, the electric actuator 90 rotates the driven shaft 20 until the movable portion 30 butts against a part of the housing 85, and acquires a rotation angle of the driven shaft 20 when the movable portion 30 butts against a part of the housing 85. Based on the acquired rotation angle, the electric actuator 90 determines the rotation angle range of the driven shaft 20 so that the movable portion 30 does not butt against a part of the housing 85.

Specifically, in the butting control of the present embodiment, the electric actuator 90 butts the fixed member 31 against a butting portion 120 of the housing 85, and acquires a rotation angle of the driven shaft 20 when the fixed member 31 butts against the butting portion 120. As described above, the housing 85 has the butting portion 120 which can come into contact with the fixed member 31 in the circumferential direction. In the present embodiment, the butting portion 120 is provided on the inner wall of the housing 85. More specifically, the butting portion 120 is provided on a portion different from the partition wall 87a on the inner wall of the second housing 85b. In the present embodiment, the butting portion 120 is provided on the rear wall portion 88e.

The butting portion 120 is located further on the left side (+Y side) and the upper side than the stopper portion 110. The butting portion 120 projects further to the front side (+X side) than a portion located on the lower side of the butting portion 120 of the rear wall portion 88e. The butting portion 120 projects further to the front side than, for example, the stopper portion 110. The butting portion 120 is composed of, for example, the step portion provided on the rear wall portion 88e.

In the present embodiment, the butting portion 120 has a flat fourth facing surface 120a facing the third facing surface 35i in the circumferential direction (rotational direction). The fourth facing surface 120a is a step surface of the step portion provided on the rear wall portion 88e. The fourth facing surface 120a is a surface facing the lower side. More specifically, the fourth facing surface 120a faces the lower side and diagonally the rear side (−X side). The fourth facing surface 120a faces the second side in the circumferential direction (−θ side). The fourth facing surface 120a extends in a direction inclined in the circumferential direction with respect to the radial direction. The fourth facing surface 120a is located further on the second side in the circumferential direction toward the radially outer side. In the butting control, the fixed member 31 is butted against the butting portion 120 as the third facing surface 35i comes into contact with the fourth facing surface 120a.

In the present embodiment, the butting portion 120 is located on the first side in the circumferential direction (+θ side) of the fixed member 31. That is, in the present embodiment, the butting portion 120 is located on the same side as the side where the stopper portion 110 is located with respect to the contact member 32 in the circumferential direction (rotational direction) with respect to the fixed member 31. In the present embodiment, the angle φ2 in the circumferential direction between the stopper portion 110 and the contact member 32 is larger than an angle φ3 in the circumferential direction between the butting portion 120 and the fixed member 31. The angle φ3 is an angle in the circumferential direction between the third facing surface 35i and the fourth facing surface 120a.

According to the present embodiment, the stopper portion 110 is provided, and the contact member 32 of the movable portion 30 can contact the stopper portion 110 in the rotational direction (circumferential direction) of the movable portion 30. For this reason, rotation more than necessary of the contact member 32 can be stopped by the stopper portion 110, and the contact member 32 can be prevented from rotating too much. In this manner, it is possible to prevent the contact member 32 from coming off the pawl member 40. Therefore, it is possible to suppress the occurrence of a malfunction in operation of the parking mechanism 10, and it is possible to improve the reliability of the parking mechanism 10. Further, since it is possible to prevent the contact member 32 from rotating too much, it is possible to prevent the first elastic member 33 that connects the contact member 32 to the driven shaft 20 from being elastically deformed too much. In this manner, it is possible to prevent the first elastic member 33 from being damaged.

For example, when the position of the pawl member 40 is switched from the parking position to the non-parking position, if the claw portion 42 of the pawl member 40 faces the tooth 51 of the parking gear 50 as illustrated in FIG. 7, the claw portion 42 may come into contact with the tooth 51 and the pawl member 40 may be flipped up. In this case, the pawl member 40 is pressed against the cam surface 37a of the contact member 32 from the lower side. Here, just before the position of the pawl member 40 is switched from the parking position to the non-parking position, the pawl member 40 is in contact with the connecting cam portion 37f which is inclined with respect to the circumferential direction of the cam surface 37a. For this reason, when the pawl member 40 is pressed against the connecting cam portion 37f from the lower side, a circumferential force is applied to the connecting cam portion 37f from the pawl member 40. In this manner, the contact member 32 is rotated by the pawl member 40. Specifically, in the present embodiment, the contact member 32 is rotated to the first side in the circumferential direction (in the +θ direction) by the pawl member 40. That is, the contact member 32 is rotated in a direction in which the position of the pawl member 40 returns to the non-parking position. At this time, since the pawl member 40 comes into contact with the tooth 51 and is flipped up, an impact is also applied to the contact member 32 to the first side in the circumferential direction via the pawl member 40, and the contact member 32 is likely to rotate significantly to the first side in the circumferential direction. For this reason, in particular, the contact member 32 may have easily come off the pawl member 40. Specifically, as a result of the contact member 32 rotating too much to the first side in the circumferential direction, an end portion on the second side in the circumferential direction (−θ side) of the cam surface 37a may have moved further to the first side in the circumferential direction than the roller 43 of the pawl member 40, and the pawl member 40 may have not come into contact with the contact member 32.

In contrast, according to the present embodiment, the stopper portion 110 is located on the side (+θ side) to which the contact member 32 moves when the position of the pawl member 40 is switched from the parking position to the non-parking position in the circumferential direction (rotational direction) with respect to the contact member 32. For this reason, even in a case where the contact member 32 is rotated in a direction in which the position of the pawl member 40 returns to the non-parking position when the pawl member 40 is flipped to the upper side, the rotation of the contact member 32 can be stopped by the stopper portion 110. In this manner, even in a case where the claw portion 42 comes into contact with the tooth 51 and the pawl member 40 is flipped to the upper side, it is possible to prevent the contact member 32 from coming off the pawl member 40. Therefore, it is possible to suppress the occurrence of a malfunction in operation of the parking mechanism 10 more, and it is possible to improve the reliability of the parking mechanism 10 more.

Further, according to the present embodiment, the contact member 32 projects radially outward from the driven shaft 20 and is rotatable in the circumferential direction around the central axis J4. That is, the stopper portion 110 faces the first facing surface 37e, which is the circumferential side surface of the contact member 32, in the circumferential direction. For this reason, the stopper portion 110 can receive the first facing surface 37e of the contact member 32 and stop the rotation of the contact member 32 in a preferable manner.

Further, according to the present embodiment, the portion facing the stopper portion 110 of the contact member 32, that is, the first facing surface 37e is located radially outer side than a portion to which the first elastic member 33 is connected of the contact member 32. For this reason, the radial position of the first facing surface 37e facing the stopper portion 110 of the contact member 32 can be placed relatively radially outer side. In this manner, the moment around the central axis J4 generated in the contact member 32 due to a reaction force received from the stopper portion 110 when the first facing surface 37e comes into contact with the stopper portion 110 can be made relatively large. Therefore, the stopper portion 110 can more preferably stop the rotation of the contact member 32. Further, a connection portion of the first elastic member 33 in the contact member 32, that is, the radial position of the insertion hole 37d can be located relatively inward in the radial direction. For this reason, when the contact member 32 rotates relative to the fixed member 31, an amount of movement in the circumferential direction of the inserted portion 33c of the first elastic member 33 can be easily reduced. In this manner, it is easy to reduce an amount of elastic deformation in the circumferential direction of the first elastic member 33, and it is easy to prevent the first elastic member 33 from being damaged.

Further, according to the present embodiment, the angle φ1 in the circumferential direction (rotational direction) between the end portion on the far side in the circumferential direction (rotational direction) from the stopper portion 110 of the cam surface 37a and the portion in contact with the pawl member 40 of the cam surface 37a is larger than the angle φ2 in the circumferential direction (rotational direction) between an end portion on the close side in the circumferential direction (rotational direction) to the stopper portion 110 of the cam surface 37a and the stopper portion 110. For this reason, for example, even in a case where the contact member 32 rotates to the first side in the circumferential direction (+θ side) when the pawl member 40 is flipped up as described above, the contact member 32 and the stopper portion 110 come into contact with each other in the circumferential direction before the end portion on the second side in the circumferential direction (−θ side) of the cam surface 37a is located further on the first side in the circumferential direction than the roller 43 of the pawl member 40. In this manner, the rotation of the contact member 32 can be stopped by the stopper portion 110 before the pawl member 40 comes off the cam surface 37a. Therefore, it is possible to more preferably prevent the contact member 32 from coming off the pawl member 40, and it is possible to more preferably improve the reliability of the parking mechanism 10.

Further, according to the present embodiment, the contact member 32 has the flat first facing surface 37e facing in the circumferential direction (rotational direction). The stopper portion 110 has the flat second facing surface 110a facing the first facing surface 37e in the circumferential direction (rotational direction). The first facing surface 37e and the second facing surface 110a are in contact with each other. Therefore, as illustrated in FIG. 7, the contact member 32 is easily brought into surface contact with the stopper portion 110. In this manner, the contact member 32 can be received by the stopper portion 110 in a preferable manner. Therefore, the stopper portion 110 makes it easier to stop the rotation of the contact member 32 in a more preferable manner. Further, since the load applied to the contact member 32 from the stopper portion 110 can be dispersed, deformation of the contact member 32 can be suppressed.

Further, according to the present embodiment, the angle φ2 in the circumferential direction (rotational direction) between the stopper portion 110 and the contact member 32 is larger than the angle φ3 in the circumferential direction (rotational direction) between the butting portion 120 and the fixed member 31. For this reason, when the butting control described above is performed, it is possible to prevent the contact member 32 from coming into contact with the stopper portion 110 before the fixed member 31 comes into contact with the butting portion 120. In this manner, the above-mentioned butting control can be performed in a preferable manner.

Further, according to the present embodiment, the fixed member 31 has the groove portion 35h on which the second elastic member 60 is hooked. For this reason, as the second elastic member 60 is hooked on the groove portion 35h, the movement of the second elastic member 60 can be suppressed, and rotation around the central axis J4 of the driven shaft 20 can be suppressed. In this manner, for example, even in a case where power supply to the electric actuator 90 is turned off, the position of the driven shaft 20 can be maintained, and a state of the parking mechanism 10 can be maintained. In contrast, in a case where the driven shaft 20 is rotated by the electric actuator 90, the second elastic member 60 can be elastically displaced, so that the second elastic member 60 can be removed from the groove portion 35h, and the driven shaft 20 and the movable portion 30 can be rotated. Therefore, a state of the parking mechanism 10 can be switched.

Further, according to the present embodiment, the stopper portion 110 is provided on the inner wall of the housing 85. For this reason, it is possible to suppress an increase in the number of parts of the drive apparatus 100 as compared with a case where the stopper portion 110 is fixed to the housing 85 as a separate member.

Further, according to the present embodiment, the stopper portion 110 is provided on the portion different from the partition wall 87a on the inner wall of the second housing 85b. Since the partition wall 87a is a wall that separates the inside of the first housing 85a from the inside of the second housing 85b, a relatively large number of structures in the inner wall of the second housing 85b are provided on the partition wall 87a, in such a manner that a hole through which the power shaft 81a passes is provided and a bearing that rotatably supports the power shaft 81a is held. Therefore, by providing the stopper portion 110 in the portion different from the partition wall 87a on the inner wall of the second housing 85b, the degree of freedom in arranging the stopper portion 110 can be improved. For this reason, the stopper portion 110 can be easily provided in the housing 85.

The present invention is not limited to the above-described embodiment, and other structures and other methods may be employed within the scope of the technical idea of the present invention. The predetermined direction in which the central axis of the driven shaft extends is not particularly limited. The predetermined direction in which the central axis of the driven shaft extends may be a direction orthogonal to the rotation axis of the parking gear. For example, in the above-described embodiment, the central axis J4 and the driven shaft 20 may extend in the vertical direction.

The stopper portion may have any configuration, as long as the stopper portion can contact the movable portion in the rotational direction of the movable portion, and faces the contact member at a distance in the rotational direction when the position of the pawl member is switched between the parking position and the non-parking position. The stopper portion is a separate member from the housing and may be fixed to the housing. In this case, the stopper portion may be, for example, a rod-shaped member. The stopper portion may be located on the side to which the contact member moves when the position of the pawl member is switched from the non-parking position to the parking position in the rotation direction with respect to the contact member.

The movable portion may have any configuration as long as the movable portion has the first elastic member and the contact member and rotates with the rotation of the driven shaft. A portion that comes into contact with the pawl member of the contact member does not need to have the cam surface and may have any configuration as long as the pawl member can be moved. In a case where the movable portion has the fixed member and the contact member, the fixed member and the contact member may be arranged at any relative position. The fixed member does not need to be provided. In this case, the first elastic member may be directly attached to the driven shaft. The butting portion does not need to be provided.

The pawl member may be movable in any way as long as the pawl member moves with the movement of the movable portion. The pawl member may have a configuration in which the entire member moves linearly in a certain direction without swinging. The groove portion on which the second elastic member is hooked may be provided on the contact member. The configuration may be such that only one of the groove portion is provided, or three or more of the groove portions are provided. The groove portion does not need to be provided. The parking gear may be attached to any part of the transmission mechanism unit.

The power unit does not need to be a motor. The power unit may be, for example, an engine. The structure of the transmission mechanism unit is not particularly limited. The configurations and the methods described above in the present description can be combined as appropriate within a scope in which no mutual contradiction arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus mounted on a vehicle, the drive apparatus comprising:
    a power unit that drives the drive apparatus;
    a transmission mechanism unit connected to the power unit;
    a parking mechanism attached to the transmission mechanism unit; and
    a housing that internally houses the power unit, the transmission mechanism unit, and the parking mechanism, wherein
    the parking mechanism comprises:
        a driven shaft that can rotate about a central axis that extends in a predetermined direction;
        a movable portion that rotates as the driven shaft rotates;
        a pawl member that has a claw portion and moves as the movable portion rotates;
        a parking gear with which the claw portion can mesh; and
        a stopper portion that can come into contact with the movable portion in a rotational direction of the movable portion,
    a position of the pawl member is switched between a parking position in which the claw portion meshes with the parking gear and a non-parking position in which the claw portion separates from the parking gear as the movable portion rotates,
    the movable portion includes
        a first elastic member attached to the driven shaft, and
        a contact member that is connected to the driven shaft via the first elastic member and comes into contact with the pawl member,
    the contact member can rotate in the rotational direction relative to the driven shaft as the first elastic member is elastically deformed, and can come into contact with the stopper portion in the rotational direction,
    the stopper portion faces the contact member at a distance in the rotational direction when the position of the pawl member is switched between the parking position and the non-parking position,
    the movable portion has a fixed member fixed to the driven shaft,
    the first elastic member is attached to the driven shaft via the fixed member, and connects the fixed member and the contact member,
    the housing has a butting portion that can come into contact with the fixed member in the rotational direction,
    the butting portion is located on a same side as a side where the stopper portion is located with respect to the contact member in the rotational direction with respect to the fixed member, and
    an angle in the rotational direction between the stopper portion and the contact member is larger than an angle in the rotational direction between the butting portion and the fixed member.

2. The drive apparatus according to claim 1, wherein the stopper portion is located on a side to which the contact member moves when the position of the pawl member is switched from the parking position to the non-parking position in the rotational direction with respect to the contact member.

3. The drive apparatus according to claim 1, wherein
    the contact member projects radially outward from the driven shaft and is rotatable in a circumferential direction around the central axis, and
    the stopper portion faces a circumferential side surface of the contact member in the circumferential direction.

4. The drive apparatus according to claim 3, wherein a portion facing the stopper portion of the contact member is located on a radially outer side than a portion to which the first elastic member is connected of the contact member.

5. The drive apparatus according to claim 1, wherein
    the contact member has a cam surface that comes into contact with the pawl member, and
    an angle in the rotational direction between an end portion on a far side in the rotational direction from the stopper portion of the cam surface and a portion in contact with the pawl member of the cam surface is larger than an angle in the rotational direction between an end portion on a close side in the rotational direction to the stopper portion of the cam surface and the stopper portion.

6. The drive apparatus according to claim 1, wherein
the contact member has a flat first facing surface facing in the rotational direction,
the stopper portion has a flat second facing surface facing the first facing surface in the rotational direction, and
the first facing surface and the second facing surface can be in contact with each other.

7. The drive apparatus according to claim 1, wherein
the parking mechanism further includes a second elastic member, and
the fixed member has a groove portion on which the second elastic member is hooked.

8. The drive apparatus according to claim 1, wherein the stopper portion is provided on an inner wall of the housing.

9. A drive apparatus mounted on a vehicle, the drive apparatus comprising:
a power unit that drives the drive apparatus;
a transmission mechanism unit connected to the power unit;
a parking mechanism attached to the transmission mechanism unit; and
a housing that internally houses the power unit, the transmission mechanism unit, and the parking mechanism, wherein
the parking mechanism comprises:
a driven shaft that can rotate about a central axis that extends in a predetermined direction;
a movable portion that rotates as the driven shaft rotates;
a pawl member that has a claw portion and moves as the movable portion rotates;
a parking gear with which the claw portion can mesh; and
a stopper portion that can come into contact with the movable portion in a rotational direction of the movable portion,
a position of the pawl member is switched between a parking position in which the claw portion meshes with the parking gear and a non-parking position in which the claw portion separates from the parking gear as the movable portion rotates,
the movable portion includes
a first elastic member attached to the driven shaft, and
a contact member that is connected to the driven shaft via the first elastic member and comes into contact with the pawl member,
the contact member can rotate in the rotational direction relative to the driven shaft as the first elastic member is elastically deformed, and can come into contact with the stopper portion in the rotational direction,
the stopper portion faces the contact member at a distance in the rotational direction when the position of the pawl member is switched between the parking position and the non-parking position,
the housing includes
a first housing that houses the power unit inside,
a second housing that houses the transmission mechanism unit inside, and
a partition wall that separates inside of the first housing from inside of the second housing, and
the stopper portion is provided on a portion different from the partition wall of an inner wall of the second housing.

10. The drive apparatus according to claim 9, wherein the stopper portion is located on a side to which the contact member moves when the position of the pawl member is switched from the parking position to the non-parking position in the rotational direction with respect to the contact member.

11. The drive apparatus according to claim 9, wherein
the contact member projects radially outward from the driven shaft and is rotatable in a circumferential direction around the central axis, and
the stopper portion faces a circumferential side surface of the contact member in the circumferential direction.

12. The drive apparatus according to claim 11, wherein a portion facing the stopper portion of the contact member is located on a radially outer side than a portion to which the first elastic member is connected of the contact member.

13. The drive apparatus according to claim 9, wherein
the contact member has a cam surface that comes into contact with the pawl member, and
an angle in the rotational direction between an end portion on a far side in the rotational direction from the stopper portion of the cam surface and a portion in contact with the pawl member of the cam surface is larger than an angle in the rotational direction between an end portion on a close side in the rotational direction to the stopper portion of the cam surface and the stopper portion.

14. The drive apparatus according to claim 9, wherein
the contact member has a flat first facing surface facing in the rotational direction,
the stopper portion has a flat second facing surface facing the first facing surface in the rotational direction, and
the first facing surface and the second facing surface can be in contact with each other.

* * * * *